Patented Sept. 15, 1953

2,652,428

UNITED STATES PATENT OFFICE 2,652,428

N-ALKYL-N-(β-METHYLSULFONAMIDO-ETHYL)-P-AMINOPHENOLS

Arnold Weissberger, John R. Thirtle, and Richard L. Bent, Rochester, N. Y., assignors to Eastman Kodak Company, Rochester, N. Y., a corporation of New Jersey No Drawing. Application May 5, 1951, Serial No. 224,824

4 Claims. (Cl. 260—556)

This invention relates to photographic developing agents and to their preparation and use.

It is known that N-alkyl-p-aminophenols are photographic developing agents, and the compound N-methyl-p-aminophenol is widely used for this purpose. Some people are, however, allergic to this compound when it comes in contact with their skin, and they cannot use developing solutions containing it.

It is therefore an object of the present invention to provide relatively non-allergenic N-alkyl-p-aminophenols. A further object is to provide a novel method for preparing non-allergenic N-alkyl-p-aminophenols. Other objects will appear from the following description of our invention.

These objects are accomplished by treating N-alkyl-p-aminophenols with β-methylsulfonamidoethyl bromide, to form N-alkyl-N-(β-methylsulfonamidoethyl)-p-aminophenols.

The compounds treated according to our invention include N-methyl-p-aminophenol hemisulfate, N-ethyl-p-aminophenol hemisulfate, 5-methylamino-2-hydroxytoluene, 2-chloro-4-hydroxyethylaminophenol, 2-amino-4-hydroxyethylaminophenol, 2-methoxy-4-methylaminophenol, etc. These compounds have the general formula

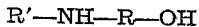

where R is a para-substituted aryl radical, and R' is an alkyl or substituted alkyl radical.

β-Methylsulfonamidoethyl bromide was prepared as follows:

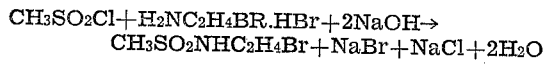

The β-bromoethylamine hydrobromide (Heilbron. I (1943), 294) (513 g.; 2.5 moles) was dissolved in 250 cc. of water in a 3-l. 3-necked flask equipped with a stirrer, thermometer and two dropping funnels. Through the latter were added 343.8 g. (3.0 moles) of methane sulfonyl chloride and 220 g. of sodium hydroxide in 800 cc. of water keeping the temperature at 0-5° and the pH slightly on the alkaline side.

The reaction mixture was stirred for one hour longer, then it was made acid to Congo red by adding 6.5 cc. of concentrated hydrochloric acid. The crystals were collected at 0° on an 18-cm. Büchner funnel and washed quickly with 200 cc. of cold water. The filtrate was extracted with two 500-cc. portions of ether and the moist crystals were taken up in 2 l. of ether. The ether layers were combined, dried over anhydrous sodium sulfate and cooled to 20°. When crystallization started, the mixture was diluted with 2 l. of petroleum ether (B. P. 30–50°).

After chilling at 5° for one-half hour, the crystals were collected on a Büchner funnel and dried in air overnight. The yield was 371 g. (73.5%) of glistening white plates melting at 47–49°.

The compounds of our invention were prepared by a one-step treatment of the alkyl aminophenol with the β-methylsulfonamidoethyl bromide in the presence of an aqueous solution of ethyl alcohol and sodium acid carbonate.

The following example illustrates our invention:

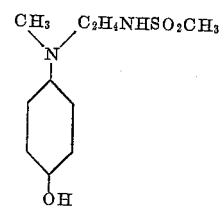

N-methyl-N-(β-methyl-sulfonamidoethyl)-p-aminophenol

A mixture of 17.2 grams (0.1 mole) of N-methyl-p-aminophenol hemisulfate, 20.2 grams (0.1 mole) of β-methylsulfonamidoethyl bromide, 17.4 grams (0.207 mole) of sodium acid carbonate, 130 cc. of water, and 120 cc. of 95% ethanol, was refluxed for four hours. The alcohol and water were then removed by distillation under reduced pressure on a steambath. The organic material was taken up in absolute alcohol (very soluble) and the alcohol evaporated. The thick, tarry-looking material was dissolved in hot water (part did not dissolve and was discarded), and the solution chilled with stirring, a light-brown crystalline solid precipitating out, contaminated with specks of tarry material. The latter was removed manually as far as possible, and the crystalline solid was taken up again in 300 cubic centimeters of hot water, treated with Darco, and allowed to cool to room temperature before being chilled. The brown crystals, 9.44 grams (38.5 per cent) melted at 112–114° C.

Analysis for $C_{10}H_{16}N_2SO_3$ was:

Calculated: C, 49.1; H, 6.55; N, 11.48.
Found: C, 49.4; H, 6.7; N, 11.4.

Other N-alkyl-p-aminophenols may be treated in a similar manner.

The following example illustrates a developing solution containing our compounds:

| | Grams |
|---|---|
| N-methyl-N-(β-methylsulfonamidoethyl)-p-aminophenol | 3.1 |
| Sodium sulfite, desiccated | 45 |
| Hydroquinone | 12 |
| Sodium carbonate, desiccated | 67.5 |
| Potassium bromide | 1.9 |
| Water to 1 liter. | |

The β-methylsulfonamidoethyl group may also be introduced into ethylanilines, e. g., 3-ethoxy-N-ethylaniline, by the method described above, and the resulting compound nitrosated and reduced to give the substituted p-phenylene diamine.

We claim:
1. A compound having the formula:

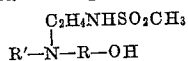

in which R is a para-hydroxy-substituted monocyclic aryl radical and R′ is an alkyl radical in which the alkyl group contains from 1 to 2 carbon atoms.

2. An N-alkyl-N-(β-methylsulfonamidoethyl)-p-aminophenol in which the alkyl group contains from 1 to 2 carbon atoms.

3. N-methyl-N-(β-methylsulfonamidoethyl)-p-aminophenol.

4. The method of making an N-alkyl-N-(β-methylsulfonamidoethyl)-p-aminophenol which comprises treating an N-alkyl-p-aminophenol in which the alkyl group contains from 1 to 2 carbon atoms, with a substantially equimolar amount of β-methylsulfonamidoethyl bromide, in the presence of an aqueous solution of sodium acid carbonate and ethanol.

ARNOLD WEISSBERGER.
JOHN R. THIRTLE.
RICHARD L. BENT.

References Cited in the file of this patent
UNITED STATES PATENTS

| Number | Name | Date |
|---|---|---|
| 2,193,015 | Weissberger | Mar. 12, 1940 |
| 2,292,212 | Dickey et al. | Aug. 4, 1942 |
| 2,358,053 | Brunings | Sept. 12, 1944 |
| 2,548,574 | Weissberger et al. | Apr. 10, 1951 |